United States Patent
Channon et al.

(10) Patent No.: US 12,474,516 B2
(45) Date of Patent: Nov. 18, 2025

(54) FLOOD AND DOT EMITTER

(71) Applicant: STMICROELECTRONICS (RESEARCH & DEVELOPMENT) LIMITED, Marlow (GB)

(72) Inventors: Kevin Channon, Edinburgh (GB); Enrico Giuseppe Carnemolla, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 180 days.

(21) Appl. No.: 17/881,236

(22) Filed: Aug. 4, 2022

(65) Prior Publication Data
US 2024/0045126 A1    Feb. 8, 2024

(51) Int. Cl.
*G02B 5/30*       (2006.01)
*F21Y 105/16*   (2016.01)
*G06V 10/145*   (2022.01)
*G06V 40/16*     (2022.01)

(52) U.S. Cl.
CPC ........ *G02B 5/3083* (2013.01); *F21Y 2105/16* (2016.08); *G06V 10/145* (2022.01); *G06V 40/161* (2022.01)

(58) Field of Classification Search
CPC ...... G01S 7/4813; G01S 7/4815; G01S 7/484; G01S 7/499; G01S 17/894; G01B 11/25; G01B 11/2513; G01B 11/22; G01B 11/2545; G01B 11/24; G01B 11/02; G01B 11/2536; G01B 11/2531; G01B 11/2527; G02B 5/3083; G02B 5/00
See application file for complete search history.

(56) References Cited

U.S. PATENT DOCUMENTS

| | | | |
|---|---|---|---|
| 7,821,583 B2 | 10/2010 | Yeh et al. | |
| 9,459,352 B2 * | 10/2016 | Becker | G01S 17/04 |
| 10,656,511 B2 | 5/2020 | Grunnet-Jepsen et al. | |
| 10,809,056 B2 | 10/2020 | Barlev et al. | |
| 11,092,719 B1 * | 8/2021 | Zhu | H04N 13/271 |
| 2012/0038892 A1 | 2/2012 | Kurtz et al. | |
| 2013/0301126 A1 | 11/2013 | Du et al. | |

(Continued)

FOREIGN PATENT DOCUMENTS

| | | | | |
|---|---|---|---|---|
| CN | 109085733 A | * | 12/2018 | G03B 21/204 |
| CN | 109891298 B | | 7/2021 | |

(Continued)

OTHER PUBLICATIONS

Arbabi et al., "Dielectric Metasurfaces for Complete Control of Phase and Polarization with Subwavelength Spatial Resolution and High Transmission," *Nature Nanotechnology*, 2015, pp. 1-27.

(Continued)

*Primary Examiner* — Uzma Alam
*Assistant Examiner* — Justin J Van Cleave
(74) *Attorney, Agent, or Firm* — Seed Intellectual Property Law Group LLP

(57) ABSTRACT

The present disclosure is directed to a device configured to act as a flood illuminator and a dot projector. The device utilizes a dual channel light source configured to switch between first and second polarizations, and a polarization sensitive metaoptic that outputs dot projection and flood illumination in response to receiving the first polarization and the second polarization, respectively.

18 Claims, 8 Drawing Sheets

(56) References Cited

U.S. PATENT DOCUMENTS

| | | | |
|---|---|---|---|
| 2016/0116647 A1 | 4/2016 | Masson et al. | |
| 2018/0091784 A1 | 3/2018 | Dutton et al. | |
| 2019/0137856 A1* | 5/2019 | Na | G01B 11/2509 |
| 2020/0033710 A1 | 1/2020 | Ma et al. | |
| 2020/0201161 A1 | 6/2020 | Tian et al. | |
| 2020/0271941 A1* | 8/2020 | Riley, Jr. | G02B 27/106 |
| 2021/0027049 A1 | 1/2021 | Chandel et al. | |
| 2021/0168226 A1 | 6/2021 | Keen et al. | |
| 2021/0223562 A1* | 7/2021 | Gopal Krishnan | G01S 7/4815 |
| 2021/0286191 A1 | 9/2021 | Downing | |
| 2021/0319290 A1 | 10/2021 | Mills et al. | |
| 2021/0342008 A1 | 11/2021 | Sachidanandam et al. | |
| 2021/0364902 A1* | 11/2021 | Alnahhas | H01S 5/423 |
| 2021/0381900 A1 | 12/2021 | Carr | |
| 2021/0383560 A1 | 12/2021 | Hall | |
| 2022/0385042 A1 | 12/2022 | Devlin et al. | |
| 2023/0019896 A1* | 1/2023 | Gronenborn | G01S 17/894 |
| 2024/0006852 A1* | 1/2024 | Fei | G01S 17/10 |
| 2024/0184124 A1 | 6/2024 | Altaqui et al. | |
| 2024/0264517 A1 | 8/2024 | Carnemolla et al. | |

FOREIGN PATENT DOCUMENTS

| | | |
|---|---|---|
| EP | 3480555 A1 | 5/2019 |
| WO | WO 0191257 A2 | 11/2001 |
| WO | WO 2017069954 A1 | 4/2017 |

OTHER PUBLICATIONS

Gao et al., "Twofold Polarization-Selective All-Dielectric Trifoci Metalens for Linearly 2 Polarized Visible Light," *Advanced Optical Materials* 1900883: 1-9, 2019.

Hu et al., "All-dielectric metasurfaces for polarization manipulation: principles and emerging applications," *Nanophotonics* 9(12): 3755-3780, 2020.

Kruk et al., "Invited Article: Broadband highly efficient dielectric metadevices for polarization control," *APL Photonics* 1(030801), Jun. 2016 (10 pages).

Mueller et al., "Metasurface Polarization Optics: Independent Phase Control of Arbitrary Orthogonal States of Polarization," *Physical Review Letters*, 118(113901):1-5, Mar. 14, 2017.

Rubin et al., "Matrix Fourier optics enables a compact full-Stokes polarization camera," *Science* 365(6448), Jul. 5, 2019 (10 pages).

Tian et al., "Dielectric longitudinal bifocal metalens with adjustable intensity and high focusing efficiency," *Optics Express 680*, 27(2):9 pages, Jan. 21, 2019.

Zang et al., "A Multi-Foci Metalens with Polarization-Rotated Focal Points," *Laser & Phototonics Reviews*, 1900182: 1-9, 2019.

Nieuborg et al., "Data Transparent Reconfigurable Optical Interconnections Based on Polarization-Switching VCSEL's and Polarization-Selective Diffractive Optical Elements," *IEEE Photonics Technology Letters* 10(7):973-975, Jul. 1998.

Xu et al., "Metasurface quantum-cascade laser with electrically-switchable polarization," *Optica* 4(4):468-475, Apr. 2017.

\* cited by examiner

FLOOD AND DOT EMITTER

BACKGROUND

Technical Field

The present disclosure is directed to illumination systems for sensors, such as time-of-flight sensors.

Description of the Related Art

Integrated optical components providing functionalities, such as face recognition, proximity detection, and ambient light sensing, have become common in mobile devices, laptops, appliances, and many other types of devices. Such functionalities are often implemented with distance or depth sensors, such as time-of-flight (ToF) sensors, that determine a distance between the sensor and a target object by measuring the time a light signal takes to travel to the target object and back to the sensor.

The light signal emitted by a distance sensor is provided by an illumination system having a light emitter, such as a vertical-cavity surface-emitting laser (VCSEL). Typically, the light illumination system is either a flood illuminator or a dot projector, depending on the application of the distance sensor.

Flood illuminators emit a strong flash that spreads light over a large region of space. Since the emitted power of the light signal is spread over a large area, the detecting capability of a distance sensor with a flood illuminator is limited to a short distance. As such, flood illuminators are often used to establish a focusing distance or the nature of a target object.

In contrast, dot projectors emit light in concentrated areas. As light is concentrated to certain areas, the detecting capability of a distance sensor with a dot projector is much further compared to a distance sensor with a flood illuminator. As such, dot projectors are often used to detect distal objects, and to precisely determine whether a target object corresponds to an authorized person.

Current devices that utilize both flood illuminators and dot projectors employ two modules with one module including a flood illuminator and another module including a dot projector. Alternatively, such devices include a single module that includes two separate and distinct light emitters. Employing two different modules or light illumination systems consumes the limited space within the device. Further, removing either the flood illuminator or the dot projector from the device would reduce performance and the dynamic range of the device.

BRIEF SUMMARY

The present disclosure is directed to a sensor, such as a time-of-flight sensor, configured to switch between two different light patterns: a flood illumination pattern and a dot projection pattern. In contrast to current systems that utilize two separate light sources and in some cases two separate optics, the sensor disclosed herein utilizes a single light source and a single optic to project the flood illumination pattern and the dot illumination pattern.

The light source is, for example, a vertical-cavity surface-emitting laser that includes a dual channel array of polarized emitters. Channel 1 of the light source emits light with a first polarization (e.g., transverse magnetic (TM) polarized light), and channel 2 of the light source emits light with a second polarization (e.g., transverse electric (TE) polarized light) orthogonal to the first polarization. The channel 1 and channel 2 emitters are arranged in columns that alternate with each other.

The light transmitted by the light source is transmitted through the optic. The optic is a polarization sensitive metaoptic that includes a plurality of asymmetrical meta-elements. The dimensions of the asymmetrical meta-elements are selected to provide the proper phase retardation to generate the dot projection pattern when Channel 1 is active, and generate the flood illumination pattern when Channel 2 is active.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing optical lenses, emitters, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, current devices that utilize both flood illuminators and dot projectors typically employ two separate and distinct modules or light emitters, with each of the two separate modules or light emitters including respective optics, receivers, and other circuitry. Employing two different modules for the same functionality, such as face recognition, proximity detection, and ambient light sensing, consumes valuable real estate within the device.

The present disclosure is directed to an optical sensor configured to switch between two different operational illuminations: flood illumination and dot projection. The device employs a single two-channel light source with one channel for each of two orthogonal polarization states; a metasurface-based polarization sensitive optic on a transmission side of the device, and an optic and detector on a reception side of the device. The illumination pattern can be chosen by the selection of the relative light source channel, with the same metasurface-based polarization sensitive optic projecting one of the two illuminations as a function of the light source polarization state. As a result, compared to current solutions that utilize two separate modules or light emitters, space consumption by the sensor within the device is reduced. Further, performance and the dynamic range of the device is improved as both flood illumination and dot projection may be used interchangeably or in conjunction with each other for detection.

Figure 1:
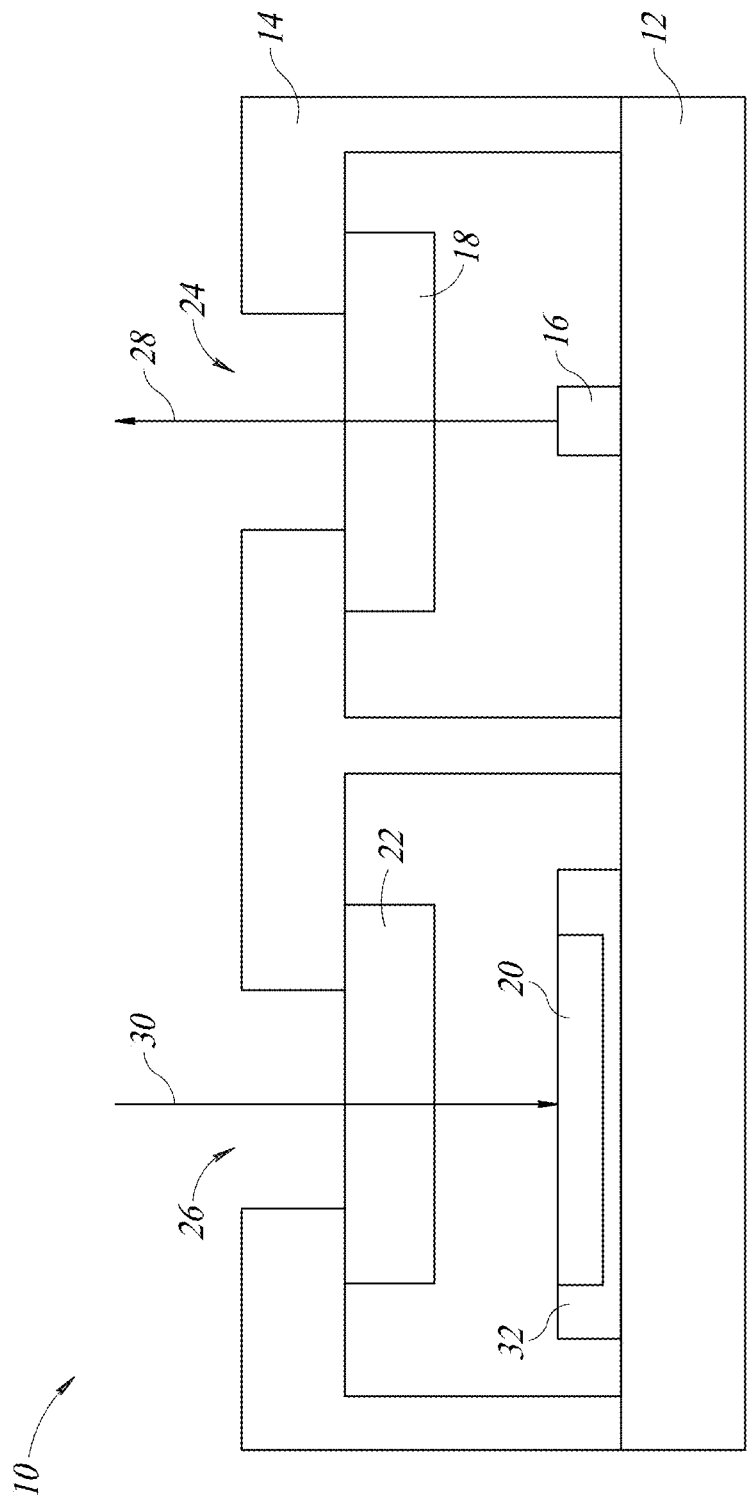
FIG. 1 is a sensor according to an embodiment disclosed herein.

FIG. 1 is a sensor 10 according to an embodiment disclosed herein. The sensor 10 is a distance or depth sensor, such as a time-of-flight (ToF) sensor, that determines distances between the sensor 10 and a target object external to the sensor 10. The sensor 10 may be included in various electronic devices (e.g., mobile handsets, cameras, tablets, laptops, and computers) for a variety of different applications, such as face recognition, proximity detection, and ambient light sensing. It is noted that the embodiments discussed herein may also be applied to other types of optical devices that utilize flood illumination and dot projection.

The sensor 10 includes a substrate 12, a body 14, a light source 16, a transmission optical structure 18, a detector 20, and a reception optical structure 22.

The substrate 12 provides a support platform for the sensor 10. The body 14, the light source 16, the transmission optical structure 18, the detector 20, and the reception optical structure 22 are positioned on the substrate 12. The substrate may be any type of rigid material, such as plastic, metal, glass, and semiconductor material. In one embodiment, the substrate 12 is a printed circuit board that includes one or more electrical components (e.g., capacitors, transistors, processors, etc.).

The body 14 is positioned on the substrate 12. The substrate 12 and the body 14, together, form an enclosure or package that contains the light source 16, the transmission optical structure 18, the detector 20, and the reception optical structure 22. The substrate 12 and the body 14 protect the light source 16, the transmission optical structure 18, the detector 20, and the reception optical structure 22 from an external environment. The body 14 includes an output aperture 24 and an input aperture 26.

The output aperture 24 directly overlies and is aligned with the light source 16 and the transmission optical structure 18. The output aperture 24 provides a hole for a light signal 28 to pass through. The light signal 28 is emitted from the light source 16, and directed to the target object in which a distance between the target object and the sensor 10 is being determined. As will be discussed in further detail below, the light signal 28 has a flood illumination pattern and/or a dot projection pattern upon being transmitted through the transmission optical structure 18.

The input aperture 26 directly overlies and is aligned with the detector 20 and the reception optical structure 22. The input aperture 26 provides a hole for a light signal 30 to pass through. The light signal 30 is the light signal 28 reflected off of the target object.

The light source 16 is positioned on the substrate 12. The light source 16 directly underlies and is aligned with the transmission optical structure 18 and the output aperture 24.

The light source 16 emits the light signal 28 through the transmission optical structure 18 and the output aperture 24. In one embodiment, the light source 16 is a vertical-cavity surface-emitting laser (VCSEL). As will be discussed in further detail below, the light source 16 is a dual channel light source that switches between a first channel that emits a first light signal having a first polarization state, and a second channel that emits a second light signal having a second polarization state orthogonal to the first polarization state.

The transmission optical structure 18 directly overlies the light source 16 and is aligned with the light source 16 and the output aperture 24. In one embodiment, the transmission optical structure 18 covers the entire output aperture 24. In one embodiment, the transmission optical structure 18 is physically coupled to the body 14.

The transmission optical structure 18 is a metasurface-based polarization sensitive optic with dual optical functions. Namely, the transmission optical structure 18 receives the light signal 28 transmitted by the light source 16, and produces a flood illumination pattern or a dot projection pattern depending on the current polarization state of the light signal 28. The transmission optical structure 18 will be discussed in further detail below.

The detector 20 is positioned on the substrate 12. The detector 20 directly underlies and is aligned with the reception optical structure 22 and the input aperture 26. In one embodiment, as shown in FIG. 1, the detector 20 is integrated into a semiconductor substrate 32. The substrate 32 may also include other various electrical components (e.g., transistors, capacitors, resistors, processors, etc.) and devices (e.g., a reference sensor array).

The detector 20 receives the light signal 30, which is the light signal 28 reflected off of the target object and passing through the input aperture 26 and the reception optical structure 22. The detector 20 includes a plurality of photodetectors that sense or measure the light signal 30. The detector 20 may be any type of sensor that measures light signals. In one embodiment, the detector is a single-photon avalanche diode (SPAD) array.

The reception optical structure 22 directly overlies the detector 20 and is aligned with the detector 20 and the input aperture 26. In one embodiment, the reception optical structure 22 covers the entire input aperture 26. In one embodiment, the reception optical structure 22 is physically coupled to the body 14.

As mentioned above, the sensor 10 determines a distance between the sensor 10 and the target object in a surrounding environment. The light source 16 transmits the light signal 28 through the transmission optical structure 18 and the output aperture 24, and at the target object. The detector 20 receives and measures the light signal 30, which is the light signal 28 that hits the target object and is reflected back through input aperture 26 and the reception optical structure 22. The sensor 10 then determines the time of flight of the light signal 28 to travel from the light source 16, to the target object, and back to the detector 20; and distances between the sensor 10 and the target object based on the time of flight.

The determined distances may then be processed for further applications, such as face recognition, proximity detection, and ambient light sensing. For example, the distances measured by the sensor 10 may be used to create a virtual profile reconstructions of a user of a device including the sensor 10.

Figure 2:
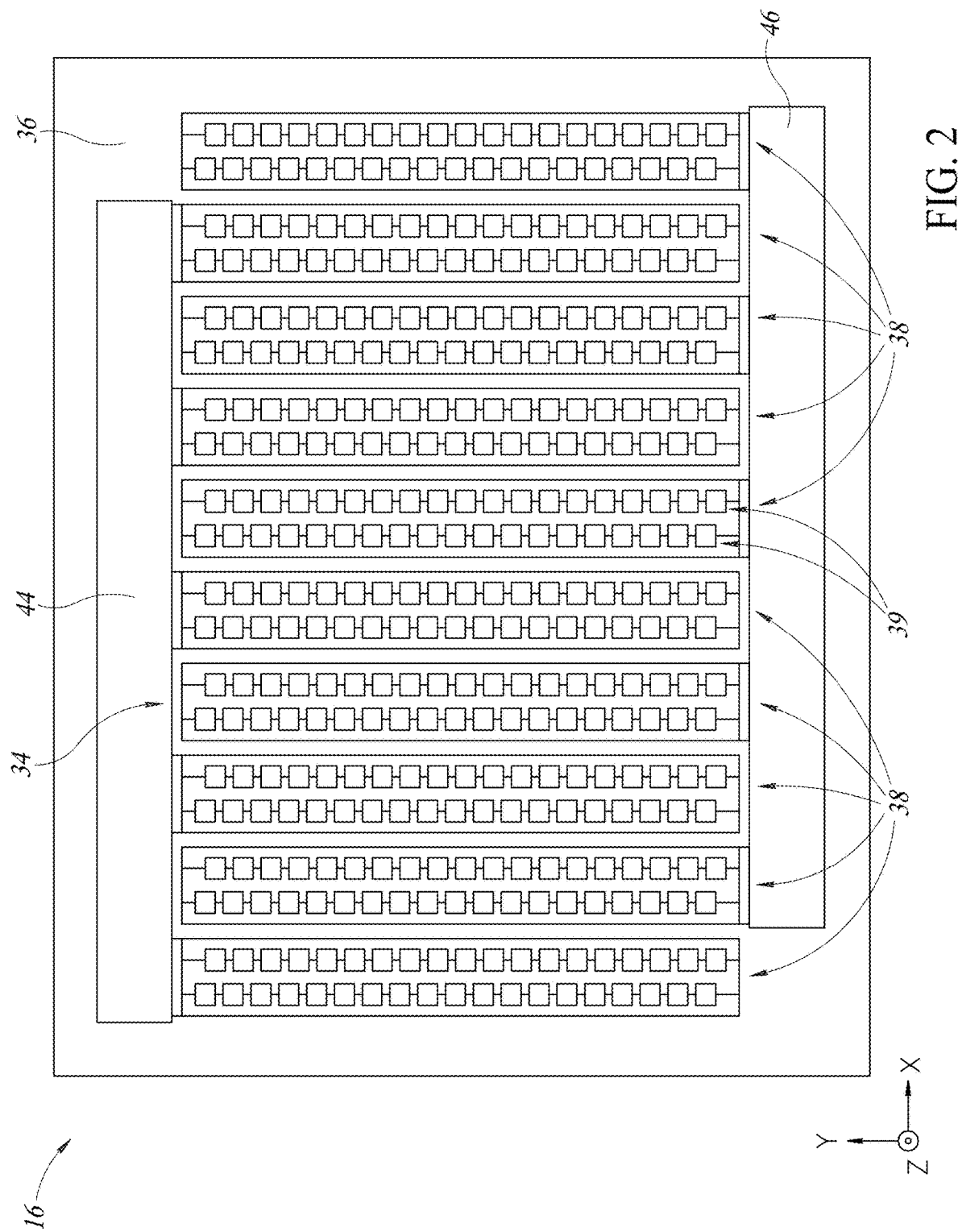
FIG. 2 is a light source according to an embodiment disclosed herein.

FIG. 2 is the light source 16, more specifically a top view of the light source 16, according to an embodiment disclosed herein. The light source 16 will be discussed with reference to the x-axis; the y-axis, which is transverse to the x-axis; and the z-axis, which is transverse to the x-axis and the y-axis, as shown in FIG. 2.

As discussed above with reference to FIG. 1, the light source 16 emits the light signal 28 through the transmission optical structure 18 and the output aperture 24. The light source 16 includes a plurality of emitters 34 on a substrate 36. The substrate 36 may be a semiconductor substrate, printed circuit board, or another type of supporting structure.

Each of the emitters 34 emits light to form a light signal, such as the light signal 28 in FIG. 1. In the view shown in FIG. 2, the emitters 34 emit light in a direction along the z-axis. Stated differently, the light emitted by each of the emitters 34 propagates out of the page.

In one embodiment, the emitters 34 are arranged as an array in a number of columns 38 positioned along the x-axis, with each of the columns 38 extending along the y-axis. Each of the columns 38 of emitters includes one or more sub-columns 39 of emitters. The emitters of each sub-column 39 are aligned with each other along the y-axis. In the embodiment shown in FIG. 2, each of the columns include two sub-columns of emitters.

In one embodiment, as shown in FIG. 2, the emitters of a first sub-column are staggered in position with the emitters of a second sub-column. Stated differently, the emitters of the first sub-column are unaligned with the emitters of a second sub-column along the x-axis such that an emitter of the second sub-column is positioned between two emitters of the first sub-column.

Other arrangement of emitters are also possible.

Figure 3:
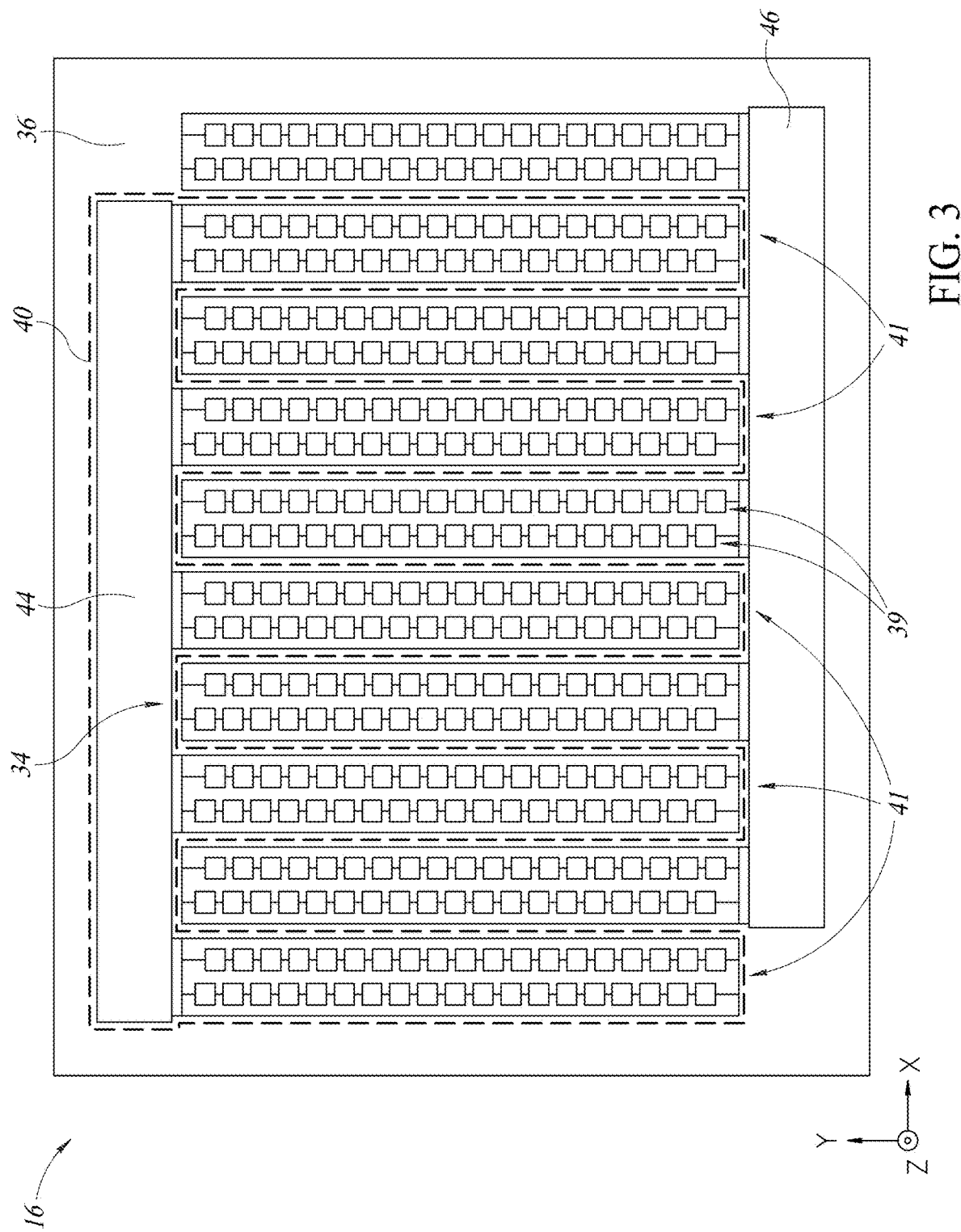
FIG. 3 shows a first channel of a light source according to an embodiment disclosed herein.
Figure 4:
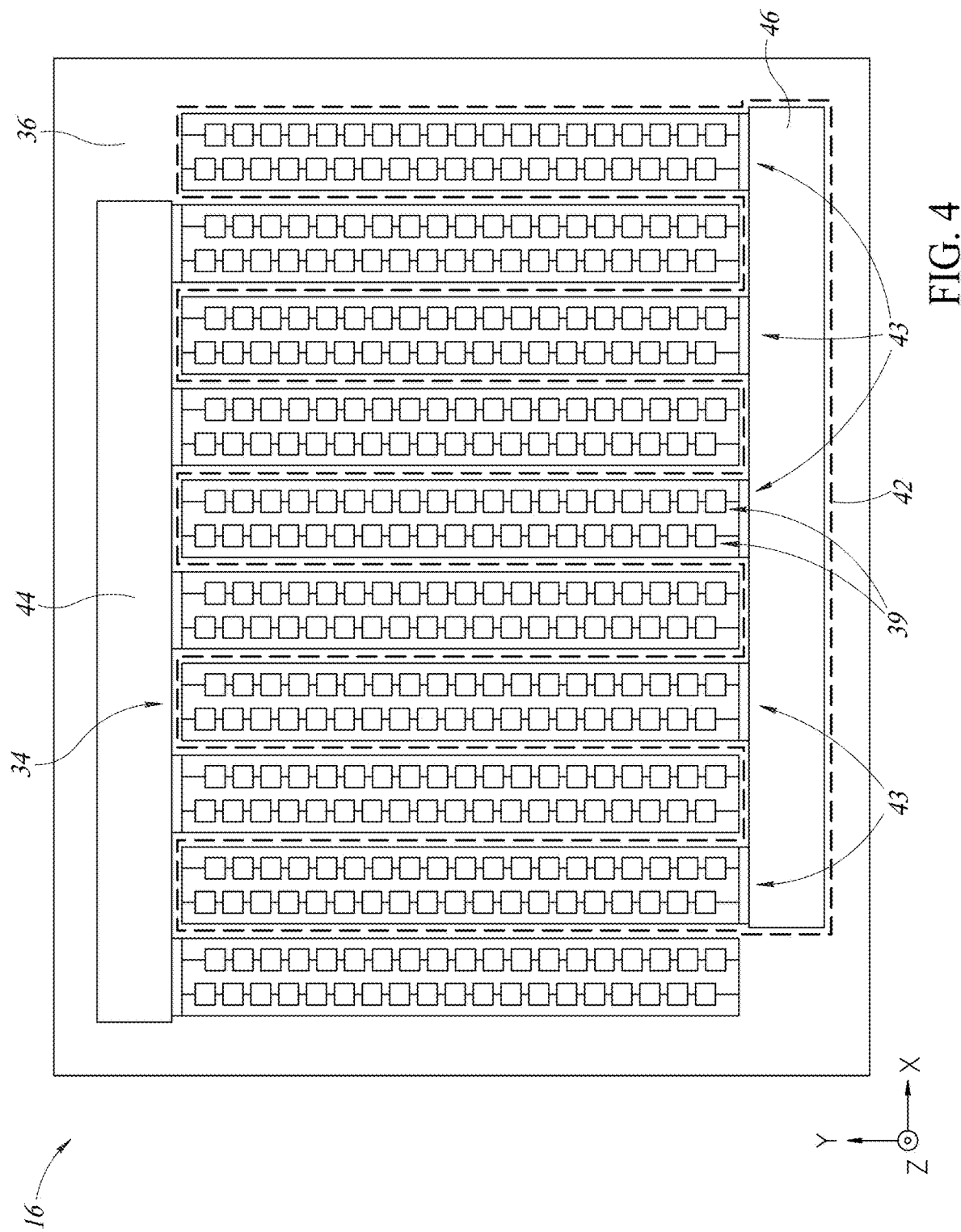
FIG. 4 shows a second channel of a light source according to an embodiment disclosed herein.

The light source 16 is a two-channel light source that switches between first and second channels. FIG. 3 shows a first channel 40 of the light source 16 according to an embodiment disclosed herein. FIG. 4 shows a second channel 42 of the light source 16 according to an embodiment disclosed herein. It is beneficial to review FIGS. 3 and 4 together.

Referring to FIG. 3, the first channel 40 is formed by a first set of columns 41 of emitters that are electrically coupled to each other by a connector 44. The emitters of the first channel 40 emit light in response to an electrical signal being applied to the connector 44.

Similarly, referring to FIG. 4, the second channel 42 is formed by a second set of columns 43 that are electrically coupled to each other by a connector 46. The emitters of the second channel 42 emit light in response to an electrical signal being applied to the connector 46.

In one embodiment, as shown in FIGS. 2-4, the connector 44 is spaced from the connector 46 by the emitters of the first channel 40 and the second channel 42.

The emitters of the first channel 40 and the second channel 42 are arranged on the substrate 36 in alternating, interleaved fashion. Namely, each column of the first set of columns 41 of emitters for the first channel 40 is spaced from another column of the first set of columns 41 along the x-axis by a column of the second set of columns 43 of emitters for the second channel 42. As a result, the emitters of the first channel 40 and the second channel 42 are not concentrated to a single area, and are able to emit light evenly across the substrate 36.

The emitters of the first channel 40 emit a light signal having a first polarization state. In one embodiment, the emitters of the first channel 40 emit a transverse magnetic (TM) polarized light signal with a magnetic field transverse to a propagation direction of the light signal. In contrast, the emitters of the second channel 42 emit a light signal having a second polarization state orthogonal to the first polarization state. In one embodiment, the emitters of the second channel 42 emit a transverse electric (TE) polarized light signal with an electric field transverse to the propagation direction of the light signal and transverse to the magnetic field of the light signal emitted by emitters of the first channel 40. As a result, the light source 16 includes one array per orthogonal polarization state.

In one embodiment, the emitters of the first channel 40 and the second channel 42 have a wavelength between 900 and 1000 nanometers.

Returning to FIG. 1, in a case where the first channel 40 of the light source 16 is activated, the light signal 28 before entering the transmission optical structure 18 has the first polarization state. Conversely, in a case where the second first channel 42 of the light source 16 is activated, the light signal 28 before entering the transmission optical structure 18 has the second polarization state.

Figure 5:
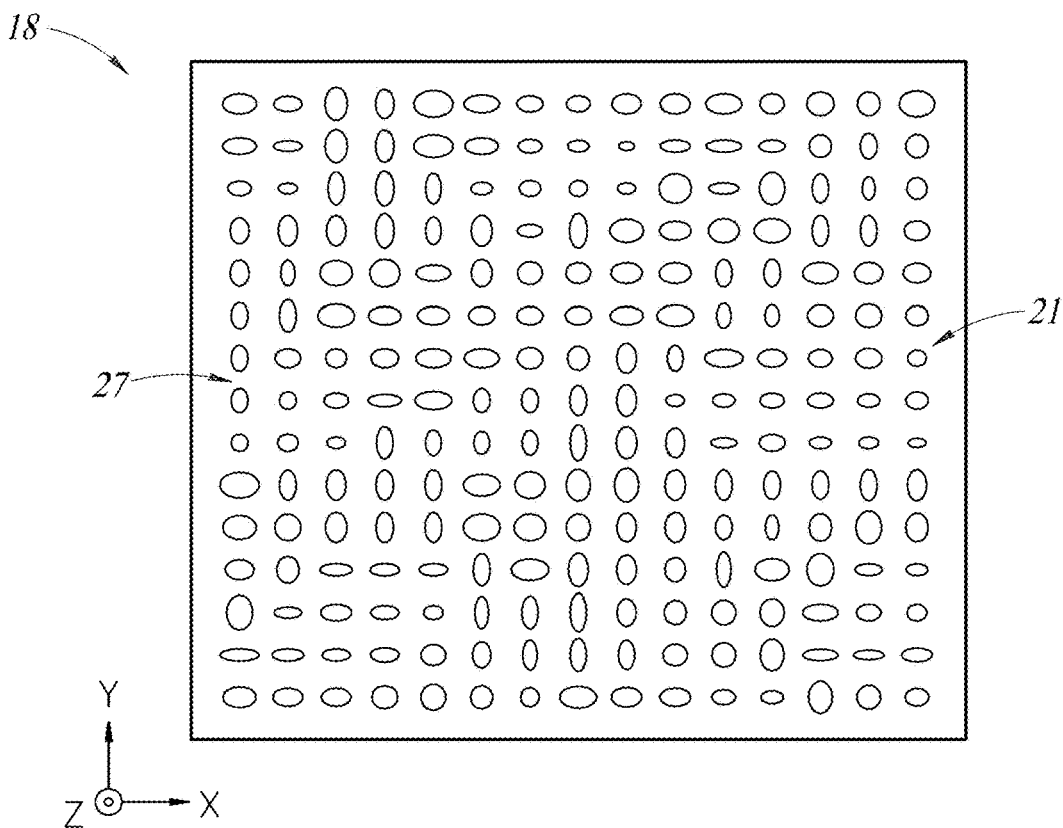
FIG. 5 is a top view of a transmission optical structure according to an embodiment disclosed herein.
Figure 6:
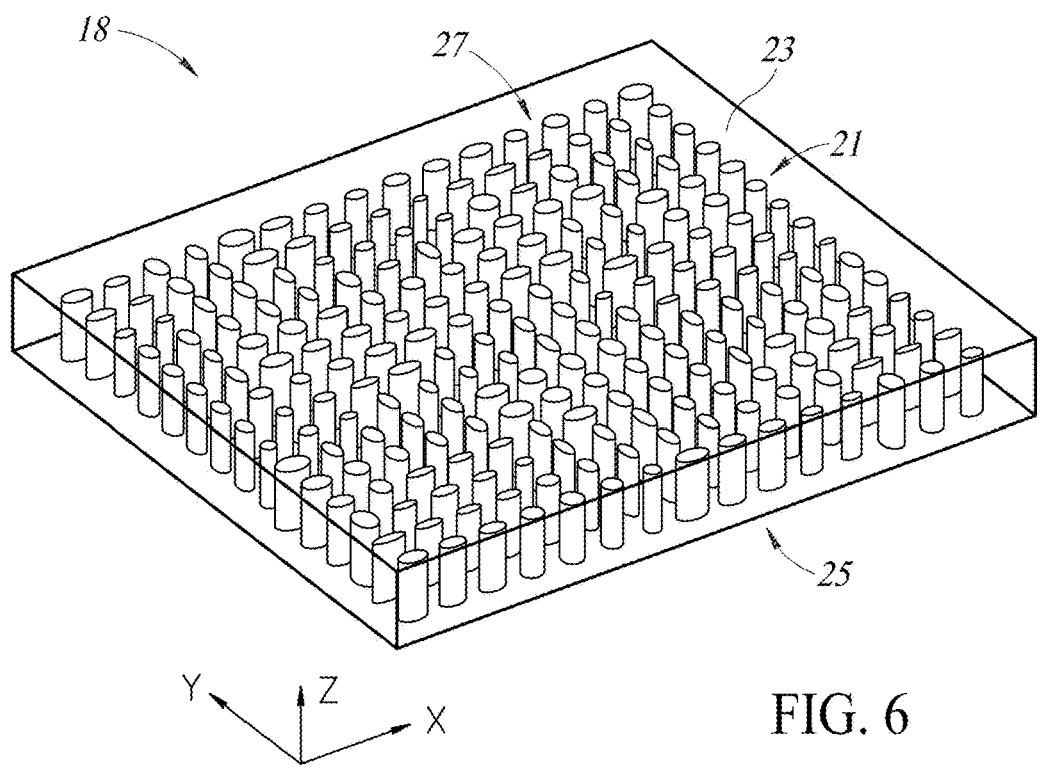
FIG. 6 is an angled view of a transmission optical structure according to an embodiment disclosed herein.

FIG. 5 is a top view of the transmission optical structure 18 according to an embodiment disclosed herein. FIG. 6 is an angled view of the transmission optical structure 18 according to an embodiment disclosed herein. It is beneficial to review FIGS. 5 and 6 together. The transmission optical structure 18 will be discussed with reference to the x-axis, the y-axis, and the z-axis as shown in FIGS. 5 and 6.

As discussed above with reference to FIG. 1, the transmission optical structure 18 receives the light signal 28 transmitted by the light source 16, and produces a flood illumination pattern or a dot projection pattern depending on the current polarization state of the light signal 28.

The transmission optical structure 18 is a metasurface-based polarization sensitive optic with dual optical functions. Typically, transmission optical structures are implemented with diffractive optical elements (DOE) in ultrathin semiconductor that opportunely manipulate a light source output wave front into a specific far field intensity profile, such as flood or dot. However, with the recent advancements in optical metasurfaces development, subwavelength dielectric nanostructures have become a remarkable candidate as technological platform for DOE, as optical metasurfaces are compatible with semiconductor fabrication processes (e.g., lithography), provide a potentially large number of phase quantization levels, and are suitable for the implementation of a variety of optical elements. Moreover, because of the natural birefringence displayed by asymmetric nanostructures, a polarization dependence can be also achieved, providing the possibility to encode different distinctive functionalities to the same optics, accessible by the selection of a proper input polarization state.

The transmission optical structure 18 includes an array of asymmetrical nano meta-elements 21. The meta-elements 21 are, for example, pillar structures, which in this embodiment are elliptical pillars. Other asymmetrical shapes are also possible. The meta-elements 21 have various dimensions. For example, as shown in FIGS. 5 and 6, a first set of the meta-elements 21 have lengths extending along the x-axis, a second set of the meta-elements 21 have lengths extending along the y-axis, and a third set of the pillars are circular with substantially equal dimensions along the x-axis and the y-axis. The meta-elements 21 are fabricated by employing semiconductor processes, such as deep UV photolithography.

In one embodiment, the meta-elements 21 are not encapsulated and surrounded by, for example, air. In one embodiment, the meta-elements 21 are encapsulated by encapsulation material 23. The meta-elements 21 extend from a lower surface 25 of the encapsulation material 23 to an upper surface 27, which is opposite to the lower surface 25, of the encapsulation material 23. The transmission optical structure 18 is positioned in the sensor 10 such that the meta-elements 21 extend in the propagation direction of the light signal 28.

The meta-elements 21 and the encapsulation material 23 are made of one or more dielectric materials. The meta-elements 21 and the encapsulation material 23 are made of different materials. For example, the meta-elements 21 and/or the encapsulation material 23 may include one or more of the following: silicon (Si), silicon dioxide, (SiO2), zinc sulphide (ZnS), galium nitride (GaN), zinc selenide (ZnSe), titanium dioxide (TiO2), silicon carbide (SiC), gallium phosphide (GaP), gallium arsenide (GaAs), and hydrogenated silicon (Si:H). In one embodiment, the delta between the refractive index of the material of the meta-elements 21 and the refractive index of the material of the encapsulation material 23 is between 1.5 and 2.

Flood illumination and dot projection functionalities are simultaneously implemented in the same physical optics, namely the asymmetrical meta-elements 21, of the transmission optical structure 18, by translating the functional design flood illumination and dot projection into the physical design of nanostructures. For example, a mapping process may be performed. The mapping process may generally include simultaneously minimizing the delta between (1) the desired phase retardation to generate the flood illumination and dot projection in specific optic coordinates and (2) the phase retardation provided in both the first and second polarizations (TM and TE polarization) of the lights source 16 by the meta-elements 21, represented by the meta-element dimensions along the x-axis and y axis.

In one embodiment, each of the meta-elements 21 displays a different optical behavior (e.g., transmission, phase retardation, etc.) as a function of incident polarization state (e.g., TM or TE polarization) of the received light signal and the dimensions of the meta-elements along the x-axis and y-axis. Namely, the dimensions of the meta-elements 21 along the x-axis and y axis are optimized to provide the proper phase retardation to generate a dot projection pattern from the light generated by the first channel 40 of the light source 16, and provide the proper phase retardation to generate a flood illumination pattern from the light generated by the second channel 42 of the light source 16. Stated differently, the dimensions of the meta-elements 21 along the x-axis and y axis are selected to alter the phase of the light transmitted by the first channel 40 to transform the light in to a dot projection pattern, and to alter the phase of the light transmitted by the second channel 42 to transform the light in to a flood illumination pattern.

As discussed above, the emitters of the first channel 40 emit a light signal having a first polarization state, such as TM polarized light; and the emitters of the second channel 42 emit a light signal having a second polarization state orthogonal to the first polarization state, such as TE polarized light. As a result, the transmission optical structure 18 projects one of flood illumination and dot projection as a function of the polarization state of the light emitted by the light source 16. Namely, the transmission optical structure 18 projects a dot projection pattern upon receiving TM polarized light generated by the first channel, and projects a flood illumination pattern upon receiving TE polarized light generated by the second channel. Accordingly, dot projection and flood illumination may be chosen by selection of the first channel 40 or the second channel 42, respectively, of the light source 16.

Figure 7:
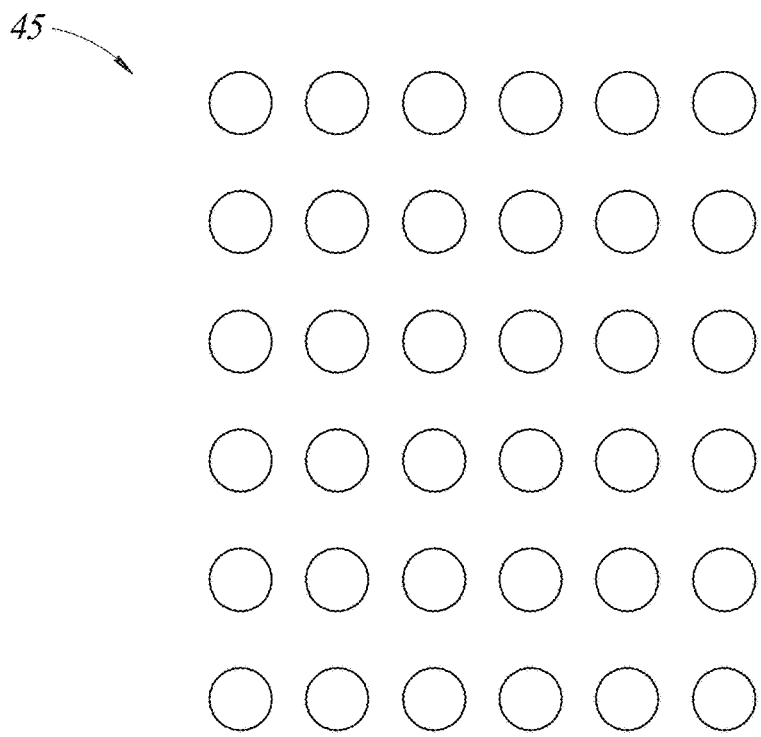
FIG. 7 is a dot projection pattern according to an embodiment disclosed herein.

FIG. 7 is a dot projection pattern 45 according to an embodiment disclosed herein. As shown in FIG. 7, light is concentrated to certain areas. For example, as shown in FIG. 7, light is concentrated into an array of light including a plurality of columns and rows of light. Other patterns of concentrated light are also possible. For example, the dot pattern may correspond to a replication of a VSCEL emitter layout according to the transmission optic function. As light in concentrated to certain areas, the detecting capability of the sensor 10 while utilizing the dot projection pattern is much further compared to utilizing the flood illumination pattern. As such, the sensor 10 may employ dot projection for applications that utilizes long distance detections, such as detecting distal objects.

Figure 8:
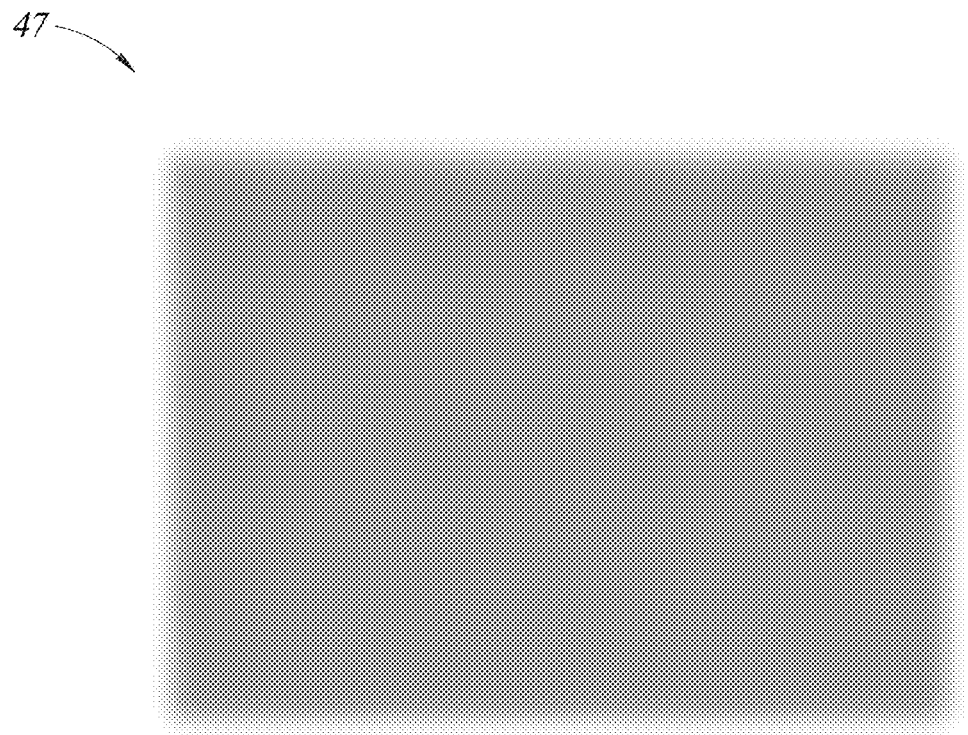
FIG. 8 is a flood illumination pattern according to an embodiment disclosed herein.

FIG. 8 is a flood illumination pattern 47 according to an embodiment disclosed herein. As shown in FIG. 8, light is spread over a large region of space. Since the emitted power of the light signal is spread over a large area, the detecting capability of the sensor 10 while utilizing the flood illumination pattern is limited to a short distance. As such, the sensor 10 may employ flood illumination for applications that utilizes short distance detections, such as establishing a focusing distance or the nature of a proximal target object.

Figure 9:
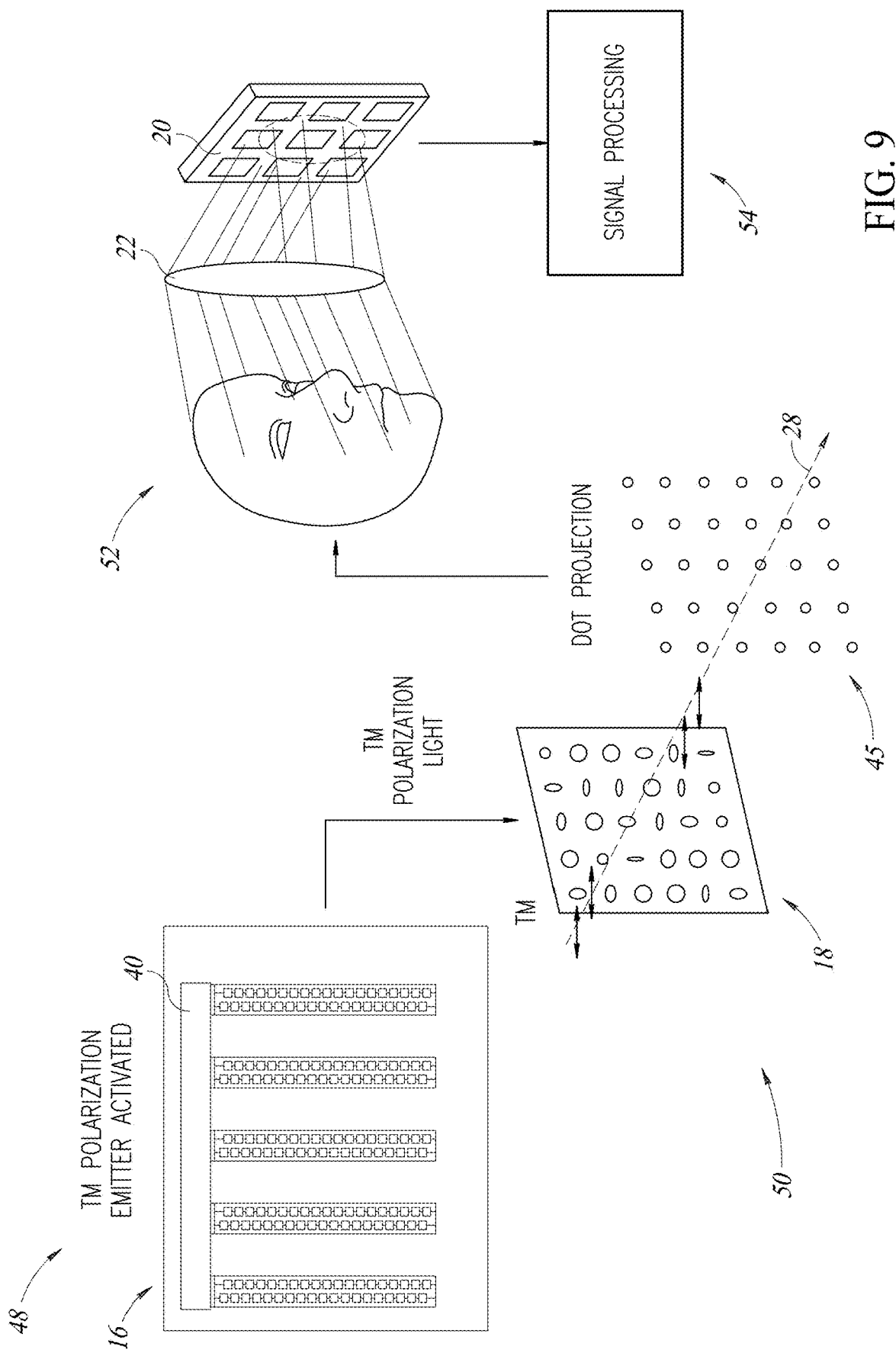
FIG. 9 is a flow diagram for dot projection according to an embodiment disclosed herein.

FIG. 9 is a flow diagram for dot projection according to an embodiment disclosed herein.

In step 48, the first channel 40 of the light source 16 is activated and the second channel 42 is deactivated. As such, as discussed above, the emitters of the first channel 40 emit a light signal having a first polarization state, which in the embodiment shown in FIG. 9 is TM polarized light. It is noted that the second channel 42 has been removed from FIG. 9 for illustrative purposes. The second channel 42 remains in the light source 16 as shown in FIGS. 2 to 4, but is inactivated.

In step 50, the TM polarized light, such as a pulse of the TM polarized light, is transmitted through the transmission optical structure 18, and a far field intensity having the dot projection pattern 45 is emitted from the transmission optical structure 18. As discussed above, in one embodiment, the dimensions of the meta-elements 21 of the transmission optical structure 18 are optimized to provide the proper phase retardation to generate the dot projection pattern from the light generated by the first channel 40, which in this embodiment is TM polarized light, maximizing at the same time the output transmission.

In step 52, the dot projection is transmitted on to a target object, which in this embodiment is a user's face, and reflected off of the target object. The reflected light is transmitted through the reception optical structure 22, and received by the detector 20. As discussed above, the detector 20 includes a plurality of photodetectors that sense or measure the reflected light signal.

In step 54, signal processing is performed on the detected light to determine distances between the sensor 10 and the target object, and generate further data depending on the application of the sensor 10, such a virtual profile reconstruction of the user's face for user authentication.

Figure 10:
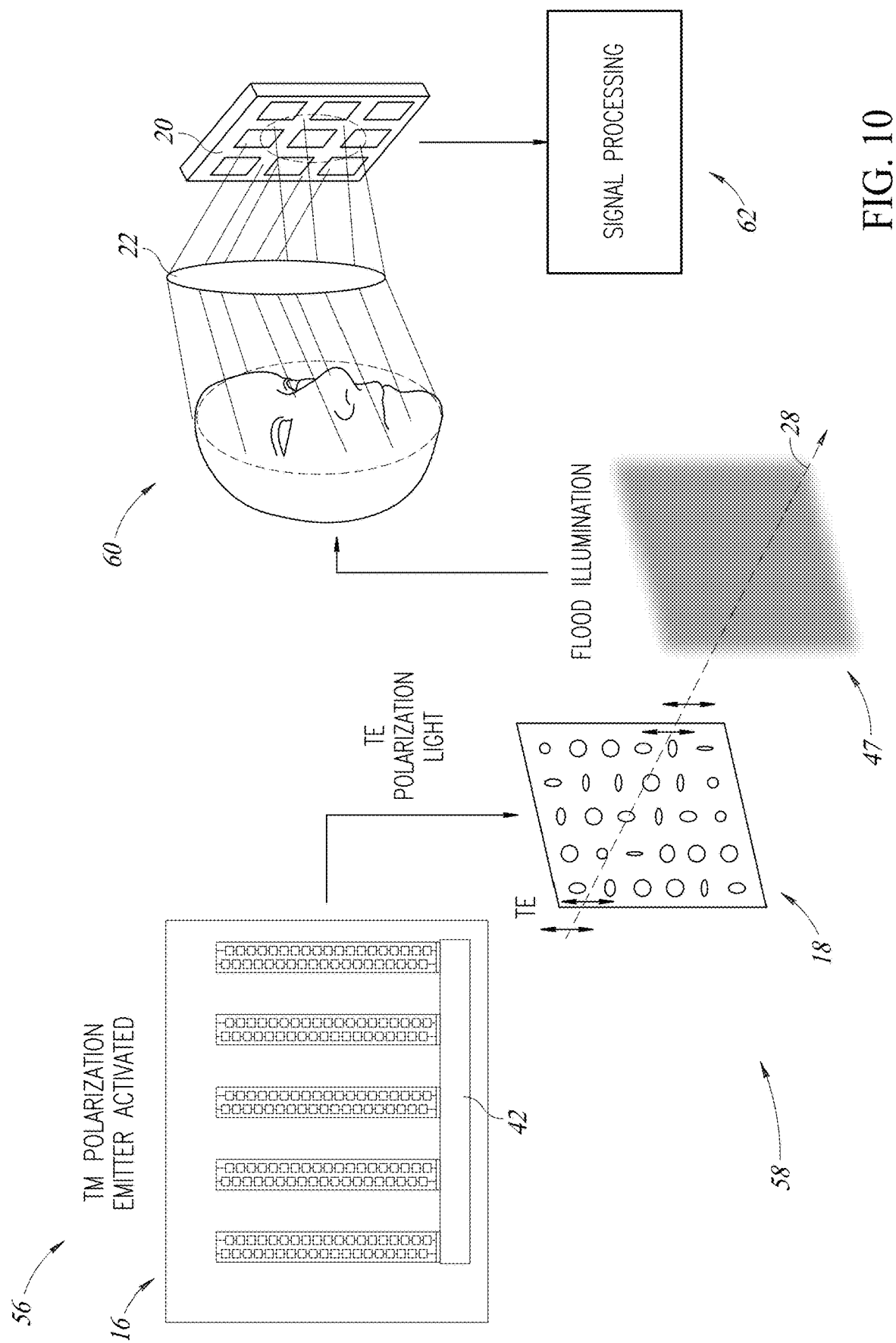
FIG. 10 is a flow diagram for flood illumination according to an embodiment disclosed herein.

FIG. 10 is a flow diagram for flood illumination according to an embodiment disclosed herein.

In step 56, the second channel 42 of the light source 16 is activated and the first channel 40 is deactivated. As such, as discussed above, the emitters of the second channel 42 emit a light signal having a second polarization state orthogonal to the first polarization state, which in the embodiment shown in FIG. 9 is TE polarized light. It is noted that the first channel 40 has been removed from FIG. 10 for illustrative purposes. The first channel 40 remains in the light source 16 as shown in FIGS. 2 to 4, but is inactivated.

In step 58, the TE polarized light, such as a pulse of the TE polarized light, is transmitted through the transmission optical structure 18, and a far field intensity having the flood illumination pattern 47 is emitted from the transmission optical structure 18. As discussed above, the dimensions of the meta-elements 21 of the transmission optical structure 18 are optimized to provide the proper phase retardation to generate the flood illumination pattern from the light generated by the second channel 42, which in this embodiment is TE polarized light.

In step 60, the dot projection is transmitted on to a target object, which in this embodiment is a user's face, and reflected off of the target object. The reflected light is transmitted through the reception optical structure 22, and received by the detector 20. As discussed above, the detector 20 includes a plurality of photodetectors that sense or measure the reflected light signal.

In step 62, signal processing is performed on the detected light to determine distances between the sensor 10 and the target object, and generate further data depending on the application of the sensor 10, such as a virtual profile reconstruction of the user's face or to establish focusing distance.

In the embodiments discussed above, the light source 16 and the transmission optical structure 18 are configured for flood illumination and dot projection. However, other types of light patterns are also possible. The dimensions of the meta-elements 21 of the transmission optical structure 18 may be optimized to provide the phase retardation to generate a circular, conical, or another shape based on the polarization of the light source 16.

In addition, in the embodiments discussed above, a single light source and a single transmission optical structure are employed. However, it is also possible to separate the functionalities of the light source 16 and the transmission optical structure 18 into multiple modules. For example, a first module including a first light source and a first transmission optical structure may be used to generate flood illumination, and a second module including a second light source and a second transmission optical structure may be used to generate dot projection.

A device may be summarized as including a light source including a first plurality of emitters configured to transmit a first light signal having a first polarization state, and a second plurality of emitters configured to transmit a second light signal having a second polarization state transverse to the first polarization state; and an optic configured to receive the first light signal and generate a first light pattern with the first light signal, and receive the second light signal and generate a second light pattern with the second light signal.

The first polarization state may be linear and the second polarization state may be orthogonal to the first polarization state.

The first plurality of emitters may be arranged in a first plurality of columns, the second plurality of emitters may be arranged in a second plurality of columns, and each column of the first plurality of columns may be spaced from another column of the first plurality of columns by a column of the second plurality of columns.

The light source may include a first connector that electrically couples the first plurality of emitters to each other, and a second connector that electrically couples the second plurality of emitters to each other.

The first connector may be spaced from the second connector by the first plurality of emitters and the second plurality of emitters.

The optic may include a plurality of meta-elements that may extend in a propagation direction of the first light signal and the second light signal.

The plurality of meta-elements may have an asymmetrical shape.

Each of the plurality of meta-elements may have an elliptical shape.

The plurality of meta-elements may include a first set of meta-elements having lengths extending in a first direction, and a second set of meta-elements having lengths extending in a second direction transverse to the first direction.

The plurality of meta-elements may be made of a first material, and may be encapsulated with a second material.

The first light pattern may be a flood illumination pattern, and the second light pattern may be a dot projection pattern.

A method may be summarized as including activating a first channel of a light source; transmitting, by the first channel of the light source, a first light signal having a first polarization state; generating, by an optic, a first light pattern with the first light signal; activating a second channel of the light source; transmitting, by the second channel of the light source, a second light signal having a second polarization state transverse to the first polarization state; and generating, by the optic, a second light pattern different from the first light pattern with the second light signal.

The first polarization state may be linear, and the second polarization state may be orthogonal to the first polarization state.

The first channel may include a first plurality of emitters arranged in a first plurality of columns, the second channel may include a second plurality of emitters arranged in a second plurality of columns, and each column of the first plurality of columns may be spaced from another column of the first plurality of columns by a column of the second plurality of columns.

The first light pattern may be a flood illumination pattern, and the second light pattern may be a dot projection pattern.

The optic may include a plurality of meta-elements that are asymmetrical shape.

A device may be summarized as including a light source including a first channel and a second channel, the first channel including a first plurality of emitters configured to transmit a first light signal having a first polarization, the second channel including a second plurality of emitters configured to transmit a second light signal having a second polarization transverse to the first polarization; and an optic configured to alter a phase of the first light signal to produce a first light pattern, and a phase of the second light signal to produce a second light pattern different from the first light pattern.

The first polarization may be linear, and the second polarization may be orthogonal to the first polarization.

The first light pattern may be a flood illumination pattern, and the second light pattern may be a dot projection pattern.

The optic may include a plurality of meta-elements that extend in a propagation direction of the first light signal and the second light signal.

The various embodiments disclosed herein provide a sensor configured to transmit a flood illumination pattern and a dot projection pattern. The sensor utilizes a single dual channel light source configured to switch between first and second polarizations, and a single polarization sensitive metaoptic that outputs the dot projection and the flood illumination in response to receiving the first polarization and the second polarization, respectively.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a substrate;
a light source positioned on the substrate and including a first plurality of emitters configured to transmit a first light signal having a first polarization state, and a second plurality of emitters configured to transmit a second light signal having a second polarization state transverse to the first polarization state,
wherein the first plurality of emitters are arranged in a first plurality of columns,
wherein the second plurality of emitters are arranged in a second plurality of columns,
wherein each column of the first plurality of columns is spaced from another column of the first plurality of columns by a column of the second plurality of columns,
wherein each of the first plurality of columns includes a first sub-column and a second sub-column,
wherein the first plurality of emitters included in the first sub-column of each of the first plurality of columns is unaligned with the first plurality of emitters included in the second sub-column of each of the first plurality of columns in a direction in which the each of the first plurality of columns extends,
wherein each of the second plurality of columns includes a first sub-column and a second sub-column, and
wherein the second plurality of emitters included in the first sub-column of each of the second plurality of columns is unaligned with the second plurality of emitters included in the second sub-column of each of the second plurality of columns in a direction in which the each of the second plurality of columns extends;
a first optic configured to receive the first light signal and generate a first light pattern with the first light signal, and receive the second light signal and generate a second light pattern with the second light signal;
a second optic configured to receive the first light signal reflected off of a target object and the second light signal reflected off of the target object; and
a detector positioned on the substrate and configured to measure the first light signal reflected off of the target object and passing through the second optic, and measure the second light signal reflected off of the target object and passing through the second optic.

2. The device of claim 1 wherein the first polarization state is linear, and the second polarization state is orthogonal to the first polarization state.

3. The device of claim 1 wherein the light source includes a first connector that electrically couples the first plurality of emitters to each other, and a second connector that electrically couples the second plurality of emitters to each other.

4. The device of claim 3 wherein the first connector is spaced from the second connector by the first plurality of emitters and the second plurality of emitters.

5. The device of claim 1 wherein the first optic includes a plurality of meta-elements that extend in a propagation direction of the first light signal and the second light signal.

6. The device of claim 5 wherein each of the plurality of meta-elements has an asymmetrical shape.

7. The device of claim 5 wherein each of the plurality of meta-elements has an elliptical shape.

8. The device of claim 7 wherein the plurality of meta-elements includes a first set of meta-elements having lengths extending in a first direction, and a second set of meta-elements having lengths extending in a second direction transverse to the first direction.

9. The device of claim 5 wherein
the plurality of meta-elements are made of a first material, and are encapsulated with a second material.

10. The device of claim 1 wherein the first light pattern is a flood illumination pattern, and the second light pattern is a dot projection pattern.

11. A method, comprising:
providing a light source on a substrate,
wherein the light source includes a first plurality of emitters configured to transmit a first light signal having a first polarization state, and a second plurality of emitters configured to transmit a second light signal having a second polarization state transverse to the first polarization state,
wherein the first plurality of emitters are arranged in a first plurality of columns,
wherein the second plurality of emitters are arranged in a second plurality of columns,
wherein each column of the first plurality of columns is spaced from another column of the first plurality of columns by a column of the second plurality of columns,
wherein each of the first plurality of columns includes a first sub-column and a second sub-column,
wherein the first plurality of emitters included in the first sub-column of each of the first plurality of columns is unaligned with the first plurality of emitters included in the second sub-column of each of the first plurality of columns in a direction in which the each of the first plurality of columns extends,
wherein each of the second plurality of columns includes a first sub-column and a second sub-column, and
wherein the second plurality of emitters included in the first sub-column of each of the second plurality of columns is unaligned with the second plurality of emitters included in the second sub-column of each of the second plurality of columns in a direction in which the each of the second plurality of columns extends;
providing a detector on the substrate;
activating the first plurality of emitters of the light source;
transmitting, by the first plurality of emitters of the light source, a first light signal having a first polarization state;
generating, by a first optic, a first light pattern with the first light signal;
receiving, by a second optic, the first light signal reflected off of a target object;

measuring, by the detector, the first light signal reflected off of the target object and passing through the second optic;

activating the second plurality of emitters of the light source;

transmitting, by the second plurality of emitters of the light source, a second light signal having a second polarization state transverse to the first polarization state;

generating, by the first optic, a second light pattern different from the first light pattern with the second light signal;

receiving, by the second optic, the second light signal reflected off of the target object; and measuring, by the detector, the second light signal reflected off of the target object and passing through the second optic.

12. The method of claim 11 wherein the first polarization state is linear, and the second polarization state is orthogonal to the first polarization state.

13. The method of claim 11 wherein the first light pattern is a flood illumination pattern, and the second light pattern is a dot projection pattern.

14. The method of claim 11 wherein the first optic includes a plurality of meta-elements that are asymmetrical shape.

15. A device, comprising:

a substrate;

a light source positioned on the substrate and including a first channel and a second channel, the first channel including a first plurality of emitters configured to transmit a first light signal having a first polarization, the second channel including a second plurality of emitters configured to transmit a second light signal having a second polarization transverse to the first polarization, wherein the first plurality of emitters are arranged in a first plurality of columns, wherein the second plurality of emitters are arranged in a second plurality of columns, wherein each column of the first plurality of columns is spaced from another column of the first plurality of columns by a column of the second plurality of columns, wherein each of the first plurality of columns includes a first sub-column and a second sub-column, wherein the first plurality of emitters included in the first sub-column of each of the first plurality of columns is unaligned with the first plurality of emitters included in the second sub-column of each of the first plurality of columns in a direction in which the each of the first plurality of columns extends, wherein each of the second plurality of columns includes a first sub-column and a second sub-column, and wherein the second plurality of emitters included in the first sub-column of each of the second plurality of columns is unaligned with the second plurality of emitters included in the second sub-column of each of the second plurality of columns in a direction in which the each of the second plurality of columns extends;

a first optic configured to alter a phase of the first light signal to produce a first light pattern, and a phase of the second light signal to produce a second light pattern different from the first light pattern;

a second optic configured to receive the first light signal reflected off of a target object and the second light signal reflected off of the target object; and a detector positioned on the substrate and configured to measure the first light signal reflected off of the target object and passing through the second optic, and measure the second light signal reflected off of the target object and passing through the second optic.

16. The device of claim 15 wherein the first polarization is linear, and the second polarization is orthogonal to the first polarization.

17. The device of claim 15 wherein the first light pattern is a flood illumination pattern, and the second light pattern is a dot projection pattern.

18. The device of claim 15 wherein the first optic includes a plurality of meta-elements that extend in a propagation direction of the first light signal and the second light signal.

* * * * *